United States Patent [19]
Hobson et al.

[11] Patent Number: 6,115,813
[45] Date of Patent: Sep. 5, 2000

[54] SELECTIVELY ENABLING ADVANCED CONFIGURATION AND POWER INTERFACE BIOS SUPPORT

[75] Inventors: Louis B. Hobson, Tomball; Christine G. Cash, Cypress, both of Tex.

[73] Assignee: Compaq Computer Corporation, Houston, Tex.

[21] Appl. No.: 09/035,166

[22] Filed: Mar. 5, 1998

[51] Int. Cl.[7] .................................................. G06F 9/44
[52] U.S. Cl. ............................................................ 713/1
[58] Field of Search ................................ 713/1, 2, 300, 713/320, 323, 324

[56] References Cited

U.S. PATENT DOCUMENTS 5,560,023  9/1996  Crump et al. ........................ 713/323
5,903,894  5/1999  Reneris ................................ 707/100

OTHER PUBLICATIONS

Intel/Microsoft/Toshiba, "Advanced Configuration and Power Interface Specification", Revision 1.0, Dec. 22, 1996.

*Primary Examiner*—Thomas M. Heckler
*Attorney, Agent, or Firm*—Conley, Rose & Tayon, P.C.; Michael F. Heim; Jonathan M. Harris

[57] ABSTRACT

A computer system is selectively booted into an advanced configuration and power interface (ACPI) mode or a non-ACPI mode during computer system start-up, depending upon the status of a user specified flag. The instructions and data needed to boot the computer system into ACPI mode can be stored in a memory in a format not visible to the computer system operating system. A user can specify the desired boot mode through a user set-up routine.

46 Claims, 4 Drawing Sheets

SELECTIVELY ENABLING ADVANCED CONFIGURATION AND POWER INTERFACE BIOS SUPPORT

BACKGROUND

The invention relates to selectively enabling whether a computer system boots-up into an advanced configuration and power interface (ACPI) mode or a non-ACPI mode.

Known power management and configuration techniques, such as the advanced power management (APM) and the plug-and-play specifications, were implemented by basic input-output system (BIOS) instructions stored in read-only memory. When a power management or configuration event occurred (e.g., a request to transition from an "on" state to a "sleep" state), the BIOS received notice of the event via an operating system transparent interrupt known as a system management interrupt. It was the responsibility of the BIOS to manipulate the necessary software state information and to control the system's hardware and perform the requested action.

Under the new ACPI, when a power management or configuration event occurs the operating system is notified via an operating system visible interrupt known as a system control interrupt (SCI). It is the operating system itself that directs all system and device power state transitions. Central to ACPI operations is an ACPI driver. This driver is an operating system level program which receives notice of all SCI events and either performs the necessary event handling actions itself, or passes control to an ACPI control method.

The ACPI specification represents an abstract interface between a computer system's hardware and firmware and its operating system. The ACPI includes hardware registers, tables, and BIOS. ACPI registers are used to store and pass event information between the hardware/firmware and operating system. ACPI tables are used to describe system information (e.g., supported power states, power sources, clock sources), features (e.g., available hardware devices), and methods for controlling those features (e.g., ACPI control methods). ACPI BIOS is that part of the computer system firmware that implements the ACPI specified interfaces for sleep, wake, some restart operations, and provides permanent storage of ACPI table information.

An ACPI operating system detects an ACPI compliant BIOS by searching predetermined BIOS memory addresses for a specified byte pattern, also known as a signature. Upon finding this pattern, the ACPI operating system commands the BIOS into ACPI mode. If the specified byte pattern is not found, the operating system will perform power management and device configuration services according to legacy (e.g., APM) specifications.

SUMMARY

In one aspect, the invention features a computer system having a host processor, random access memory, basic input-output system (BIOS) memory, a detector, and a mode circuit. The detector is configured to detect if the user specified an advanced configuration and power interface (ACPI) start-up or a non-ACPI start-up. The mode circuit is connected to the detector and, if the user specified an ACPI start-up, loads ACPI instructions from the BIOS memory to the random access memory at a location known by the ACPI operating system.

In some embodiments, the ACPI instructions are stored in a compressed format in the BIOS memory. The BIOS memory may, or may not, also include non-ACPI start-up instructions. BIOS memory may be a read-only random access memory. The computer system can include additional elements such as: a non-volatile memory which can be used to store the user specified mode; and an input-output device such as a mass storage device, a keyboard, or a pointer.

In another aspect, the invention provides a method to start-up a computer system. The method determines which mode a user specified and, if the specified mode is ACPI, loads ACPI instructions into system memory. If the user specified a non-ACPI mode, non-ACPI start-up instructions are loaded into system memory.

DETAILED DESCRIPTION

Figure 1:
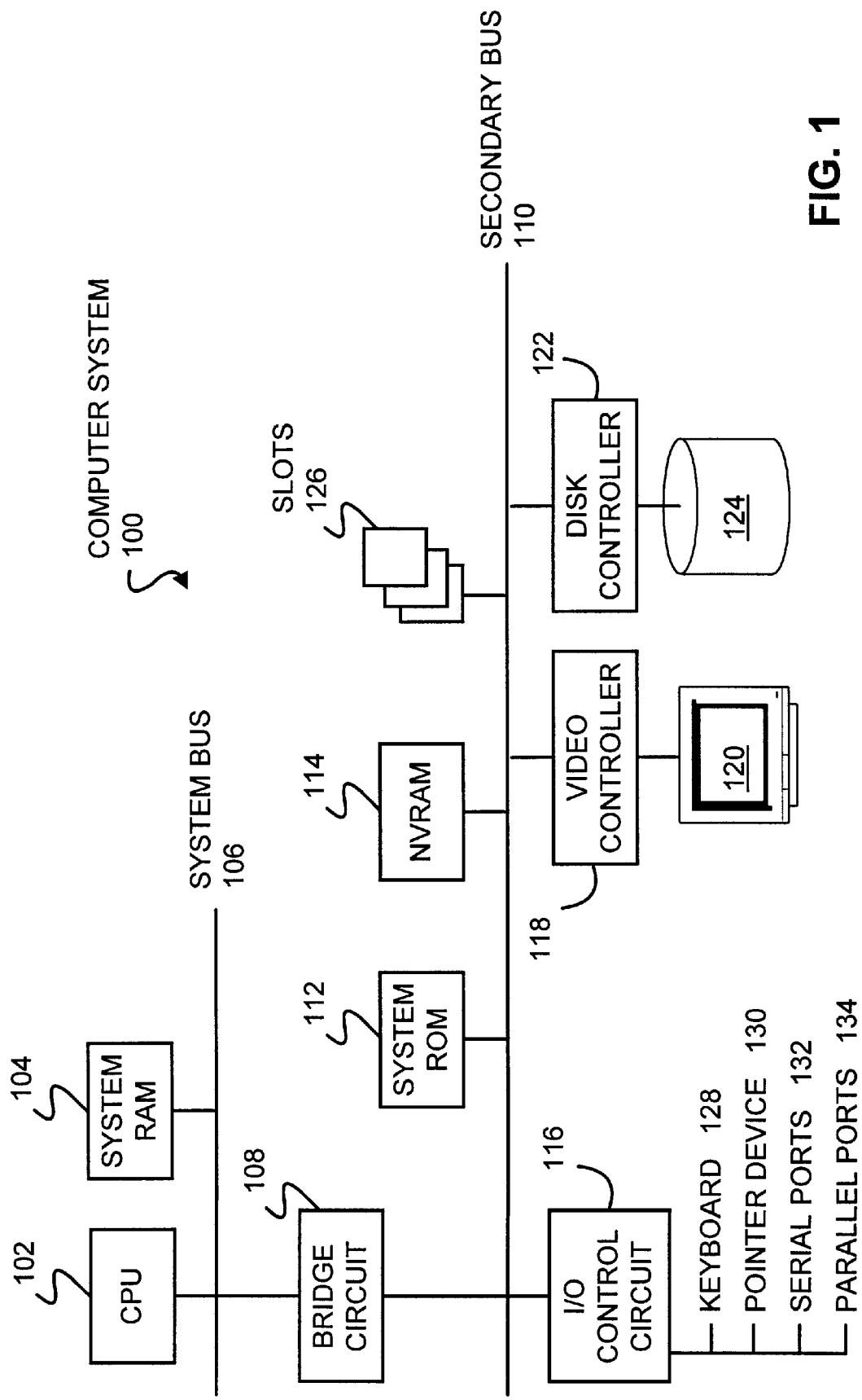
FIG. 1 shows a computer system.

Referring to FIG. 1, computer system 100 (allowing a user to select whether to boot into an advanced configuration and power interface (ACPI) mode or a non-ACPI mode) includes host processor (CPU) 102 and random access memory (RAM) 104 coupled to system bus 106. Illustrative host processors 102 include the PENTIUM, PENTIUM PRO, PENTIUM-II, and 80×86 families of processors from Intel Corporation.

Bridge circuit 108 couples system bus 106 to secondary bus 110. Components coupled to secondary bus 110 include: read only memory (ROM) 112; nonvolatile RAM (NVRAM) 114; input-output (I/O) control circuit 116; video controller 118 and associated display 120; disk controller 122 and associated disks (one shown) 124; and one or more expansion slots 126. Input-output circuit 116 couples components such as keyboard 128, pointer device 130, and serial 132 and parallel 134 ports to computer system 100. System ROM 112 and NVRAM 114 are described in more detail below.

Figure 2:
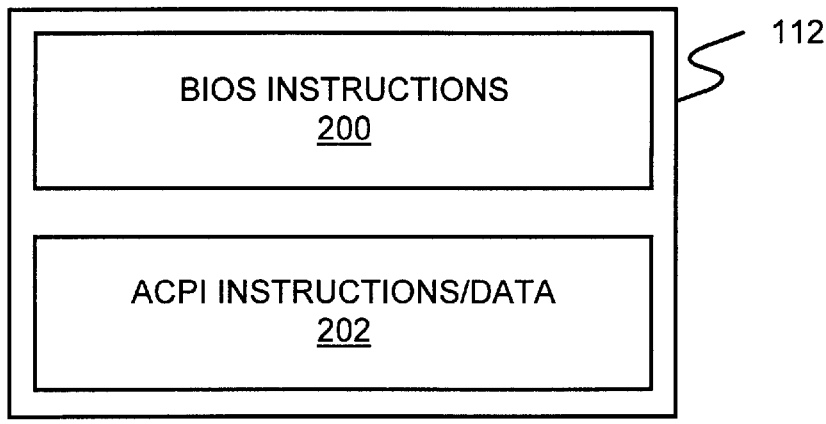
FIG. 2 shows a read-only memory device.
Figure 3:
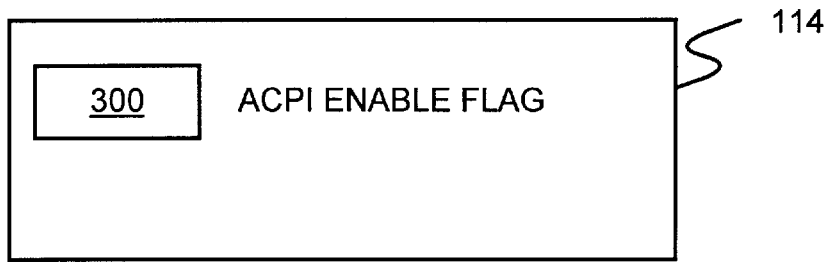
FIG. 3 shows a non-volatile random access memory (NVRAM) device.

As shown in FIG. 2, system ROM 112 includes BIOS instructions 200 and ACPI instructions/data 202. ACPI instructions/data 202 include, for example, ACPI table data and static power management information. As shown in FIG. 3, NVRAM 114 includes ACPI enable flag 300 which is used during computer system start-up to determine if ACPI instructions/data 204 should be loaded into system RAM 104 for subsequent use by an ACPI operating system.

Figure 4:
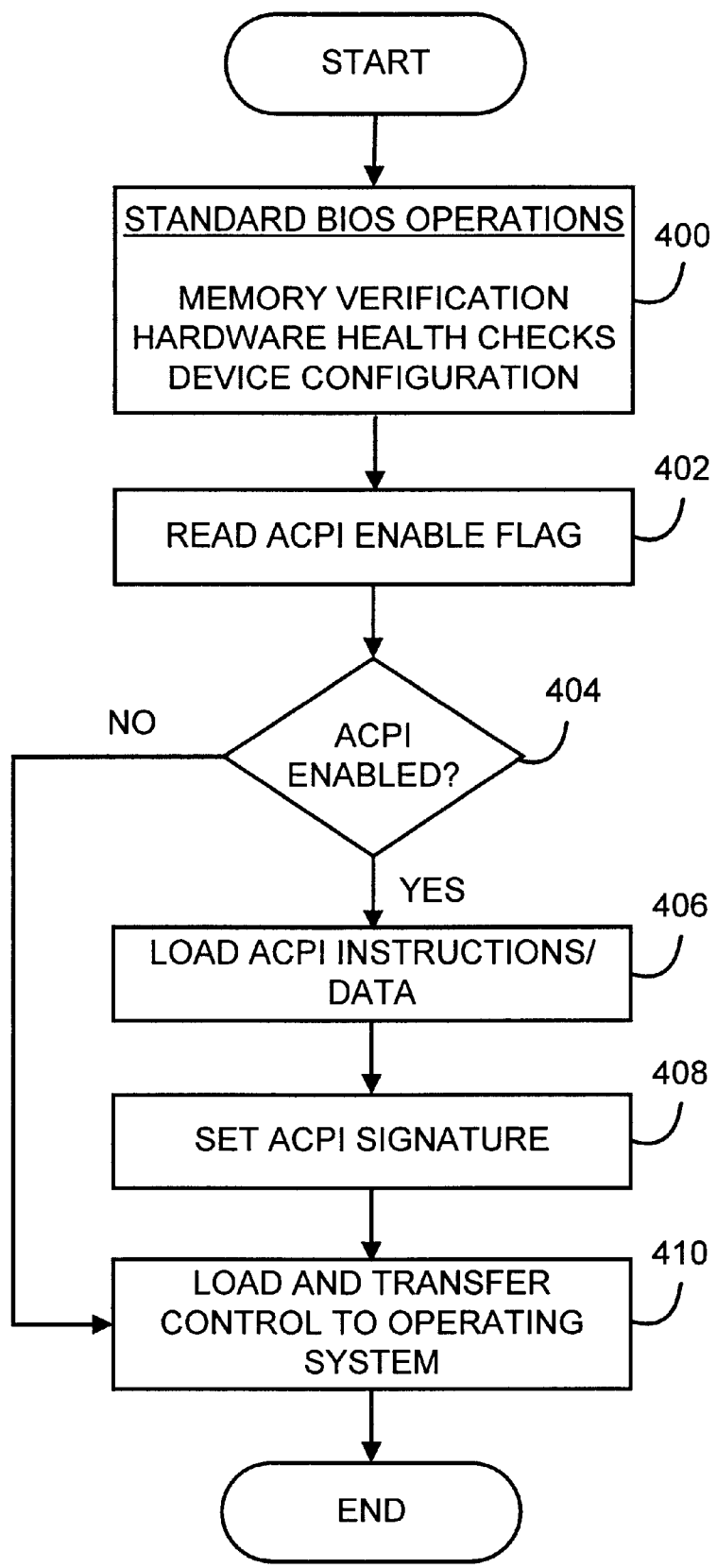
FIG. 4 shows computer system start-up operations.

Referring now to FIG. 4, when computer system 100 is powered up or reset, host processor 102 begins executing BIOS start-up instructions from system ROM 112. After performing standard BIOS actions such as verifying system memory, performing hardware health checks, and configuring system devices (step 400), a check is made to determine if computer system 100 should boot-up in an ACPI aware mode. Specifically, BIOS interrogates NVRAM 114 for the status of ACPI enable flag 300 (step 402). If ACPI enable flag 300 indicates computer system 100 should boot in an ACPI aware mode (the 'yes' prong of step 404), ACPI instructions/data 202 are loaded into system RAM 104 (step 406), for use by the ACPI operating system (see step 410), and the ACPI byte pattern (signature) is established in memory space (step 408) as required by the ACPI specification. Following step 408, or if ACPI enable flag 300 indicates computer system 100 should be booted into legacy mode (the 'no' prong of step 404), BIOS looks for and transfers control to an operating system (step 410). This last step is known as "boot-strapping" the operating system.

Figure 5:
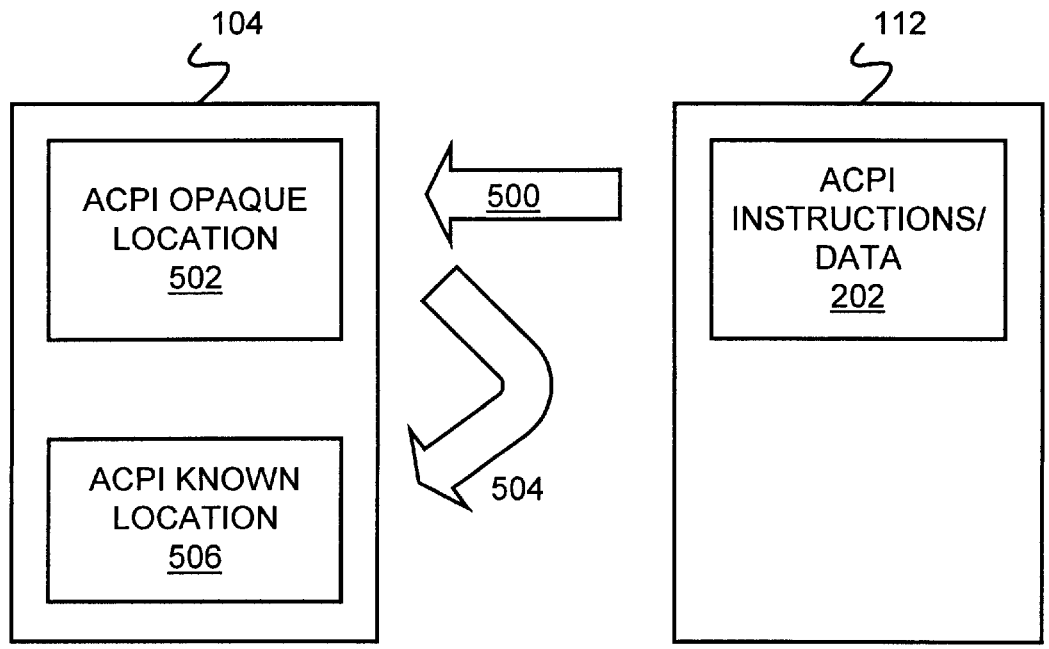
FIG. 5 shows loading advanced configuration and power interface instructions and data from read only memory to random access memory during computer system start-up.

As shown in FIG. 5, ACPI instructions/data 202 are commonly copied 500 into a first location 502 in system RAM 104 during computer system start-up (e.g., during step 400). While an ACPI operating system may physically access this first location 502, information about what data is stored there is not generally known (is opaque) to the operating system. Thus, ACPI instructions/data 202 initially copied into system RAM 104 from system ROM 112 are not functionally accessible to the operating system. If ACPI is enabled (the 'yes' prong of step 404 in FIG. 4), ACPI instructions/data are copied 504 from the first location 502 into a second location 506 that the ACPI operating system is cognizant of during step 406. At this point ACPI instructions/data 202 have been loaded.

ACPI instructions/data 202 can be stored in system ROM 112 in a compressed format so that the operating system cannot determine, by inspecting system ROM 112 directly, if ACPI instructions/data are present. This technique saves system ROM 212 memory space and, in effect, hides ACPI capability from the operating system.

Figure 6:
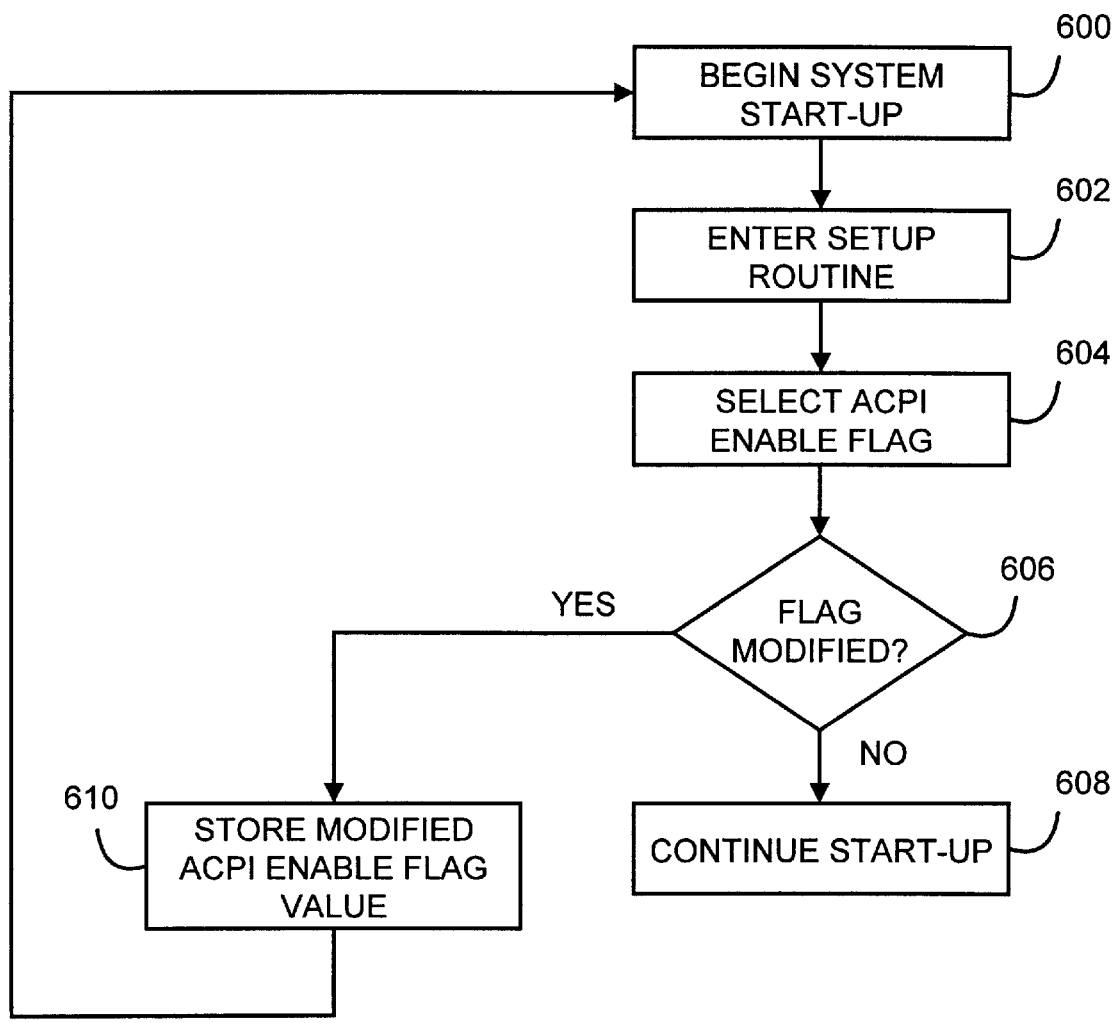
FIG. 6 shows a method to modify a status flag in non-volatile random access memory.

As shown in FIG. 6, the user may selectively set ACPI enable flag 300 through a user interface. As computer system start-up begins (step 600), the user is given an opportunity to enter a system set-up routine (step 602) via a predetermined key command (e.g., F10 keystroke). Once in this routine, the user can select ACPI enable flag 300 for modification (step 606). If the user decides against changing the status of ACPI enable flag 300 (the 'no' prong of step 608), start-up processing continues at step 608 (see FIG. 4). If the user modifies ACPI enable flag 300 (the 'yes' prong of step 606), that change is written back to NVRAM 114 (step 610) and computer start-up operations are initiated from the beginning at step 600 (see FIG. 4).

The foregoing description is illustrative only and is not to be considered limiting. Various changes in the materials, components, circuit elements, as well as in the details of the illustrated operational methods are possible without departing from the scope of the claims. For example, system bus 106 and secondary bus 110 can be proprietary or special purpose buses, peripheral component interface (PCI) buses, industry standard architecture (ISA) buses, extended industry standard architecture (EISA) buses, or combinations of one or more of these buses. ACPI instructions/data 202 can be stored in compressed or uncompressed form. Additionally, ACPI enable flag 300 does not have to be stored in NVRAM 114. Any nonvolatile means of storage in any location accessible to host processor 102 during start-up may be used. Steps of the invention may be performed by a computer processor executing instructions organized into a program module. Storage devices suitable for tangibly embodying computer program instructions include all forms of nonvolatile memory including, but not limited to: semiconductor memory devices such as EPROM, EEPROM, and flash devices; magnetic disks (fixed, floppy, and removable); other magnetic media such as tape; and optical media such as CD-ROM disks.

Each embodiment of the invention may provide one or more advantages. For example, the invention allows a user to specify which mode their computer system should start-up in: ACPI mode, or non-ACPI mode.

What is claimed is:

1. A computer system comprising:

a bus;

a host processor operatively coupled to the bus;

memory operatively coupled to the bus;

an input-output device operatively coupled to the bus;

a user specified Advanced Configuration and Power Interface (ACPI) mode indicator operatively coupled to the bus; and a mode circuit that selectively loads advanced configuration and power interface instructions into the memory depending on the ACPI-mode indicator.

2. The computer system of claim 1, wherein the advanced configuration and power interface instructions are stored in a basic input-output system memory.

3. The computer system of claim 2, wherein the basic input-output memory comprises a programmable read only memory.

4. The computer system of claim 1, wherein the advanced configuration and power interface instructions include advanced configuration and power interface data tables and advanced configuration and power interface control method instructions.

5. The computer system of claim 1, wherein the advanced configuration and power interface instructions are, before loading, in a compressed form.

6. The computer system of claim 5, wherein the compressed advanced configuration and power interface instructions are not visible, before loading, to an operating system.

7. The computer system of claim 1, further comprising a non-volatile memory operatively connected to the bus.

8. The computer system of claim 7, wherein the user specified ACPI-mode indicator is stored in the nonvolatile memory.

9. The computer system of claim 1, wherein the user specified ACPI-mode indicator is set by a set-up routine having instructions to:

receive a desired value for the ACPI-mode indicator from a user; and store the received value in a second memory accessible to the host processor.

10. The computer system of claim 9, wherein the second memory comprises a nonvolatile memory.

11. The computer system of claim 1, wherein the input-output device comprises a pointer device.

12. A computer system comprising:

a bus;

a host processor operatively coupled to the bus;

an input-output device operatively coupled to the bus;

random access memory operatively coupled to the bus;

a basic input-output system memory operatively coupled to the bus, the basic input-output system memory comprising compressed advanced configuration and power interface instructions;

a nonvolatile memory operatively coupled to the bus, the nonvolatile memory comprising a user specified mode indicator; and a mode circuit that loads the compressed advanced configuration and power interface instructions into the random access memory depending on the value of the user specified mode indicator.

13. The computer system of claim 12, wherein the advanced configuration and power interface instructions comprise advanced configuration and power interface data tables and advanced configuration and power interface control method instructions.

14. A computer memory, comprising:
means for operatively connecting the computer memory to a computer bus;
instructions to determine if a user specified flag is set;
compressed advanced configuration and power interface instructions (ACPI) which run the computer in ACPI mode based on the state of the user specified flag; and
non-compressed non-advanced configuration and power interface instructions which run the computer in a non-ACPI mode based on the state of the user specified flag.

15. The computer memory of claim 14, wherein the memory comprises a read-only random access memory.

16. The computer memory of claim 14, wherein the noncompressed non-advanced configuration and power interface instructions comprise instructions to boot a computer system.

17. A method of starting a computer system that execute an advanced configuration and power interface operating system, the method comprising:
determining if a user specified flag is set; and
loading advanced configuration and power interface instructions from a first memory to a second memory if the user specified flag is set.

18. The method of claim 17, wherein determining if a user specified flag is set comprises interrogating a third memory for a value of the user specified flag.

19. The method of claim 18, wherein the third memory is a nonvolatile memory.

20. The method of claim 17, wherein loading advanced configuration and power interface instructions comprises:
copying advanced configuration and power interface instructions from the first memory to a first location in the second memory, where the first location is opaque to the operating system; and
copying the advanced configuration and power interface instructions from the first location in the second memory to a second location in the second memory where the second location is known to the operating system.

21. The method of claim 17, wherein the advanced configuration and power interface instructions includes advanced configuration and power interface data.

22. The method of claim 17, wherein non-advanced configuration and power interface instructions are loaded into the second memory from a fourth memory if the user specified flag is not set.

23. The method of claim 17, wherein the first memory comprise a read-only memory including basic input-output system instructions.

24. The method of claim 17, wherein the second memory comprise random access memory.

25. The method of claim 18, wherein the first and third memory are the same memory.

26. The method of claim 17, wherein the advanced configuration and power interface instructions comprise advanced configuration and power interface data tables and advanced configuration and power interface control method instructions.

27. The method of claim 17, wherein the advanced configuration and power interface instructions are in a compressed form.

28. The method of claim 27, wherein the compressed advanced configuration and power interface instructions are not visible to an operating system when reading the first memory.

29. A method of starting a computer system for executing an advanced configuration and power interface operating system, the method comprising:
determining if a user specified flag is set, the user specified flag being stored in a nonvolatile memory;
if the user specified flag is set, the user specified flag being stored in a nonvolatile memory;
if the user specified flag is set, decompressing advanced configuration and power interface instructions from a basic input-output system memory and loading the decompressed advanced configuration and power interface instructions into a random access memory; and
if the user specified flag is not set, loading non-advanced configuration and power interface instructions from the basic input-output system memory into the random access memory.

30. The method of claim 29, wherein the advanced configuration and power interface instructions comprise advanced configuration and power interface data tables and advanced configuration and power interface control method instructions.

31. A computer system, comprising:
a CPU;
a video controller coupled to video display device;
a first system memory containing advanced configuration and power interface (ACPI) instructions;
an ACPI enable flag register in a non-volatile random access memory for indicating whether the computer system should be run in an ACPI mode;
a basic input output system (BIOS) program residing on said first system memory executed by the CPU that reads a status of the ACPI enable flag and starting the computer system in ACPI mode based on a state of the ACPI enable flag.

32. The computer system as defined in claim 31 further comprising:
a second system memory coupled to the CPU;
said BIOS program containing instructions for the CPU to execute that copies the ACPI instructions from said first system memory to a first location within the second system memory;
said BIOS program also containing instructions for the CPU to execute to copy said ACPI instructions from said first location to a second location within the second system memory and establishing an ACPI signature byte pattern as required to operate in an ACPI mode when the ACPI enable flag is asserted.

33. The computer system as defined in claim 32 wherein said first location within the second memory is not accessible to an operating system residing on the computer system and said second location within second memory is accessible to the operating system.

34. The computer system as defined in claim 31 wherein said first system memory is a read only memory (ROM) device.

35. The computer system as defined in claim 32 wherein said second system memory is a random access memory (RAM) device.

36. The computer system as defined in claim 31 wherein said ACPI instructions are stored on said first system memory in a compressed form.

37. The computer system as defined in claim 36 further comprising:
a second system memory coupled to the CPU; and
said BIOS program including instructions executed by the CPU that write a decompressed set of ACPI instructions from said first system memory to the second system memory including establishing an ACPI signature byte pattern as required to operate in an ACPI mode when the ACPI enable flag is asserted.

38. A computer system read only memory (ROM) device comprising:

advanced configuration and power interface (ACPI) instructions; and a basic input output system (BIOS) program to read a status of an ACPI enable flag and starting the computer system in ACPI mode based on the ACPI enable flag.

39. The ROM device as defined in claim 38 further comprising:

non-ACPI instructions;

said BIOS program that makes the ACPI instructions available to an operating system based on a first state of the ACPI enable flag; and said BIOS program for making the non-ACPI instructions available to the operating system based on a second state of the ACPI enable flag.

40. The ROM device as defined in claim 39 wherein said ACPI instructions are in a compressed format.

41. A method of operating a computer system, the method comprising:

masking an advanced configuration and power interface (ACPI) signature byte pattern in a system memory to hide the presence of ACPI data and instructions; and selectively un-masking said ACPI byte pattern to allow the computer system to run in an ACPI mode.

42. The method as defined in claim 41 wherein the step of masking the ACPI signature byte pattern further comprises compressing said byte pattern to create a compressed ACPI byte pattern and storing the compressed ACPI pattern in a read only memory.

43. The method as defined in claim 41 wherein the step of masking the ACPI signature byte pattern further comprises writing said byte pattern to a location within a random access memory that is not accessible to an operating system.

44. The method as defined in claim 41 wherein said step of selectively un-masking said ACPI byte pattern further comprises:

determining whether a user specified flag is set to indicate that the computer should be run in ACPI mode; and selectively un-masking the ACPI signature byte based on a state of the user specified flag.

45. The method as defined in claim 44 wherein the step of un-masking the ACPI signature byte further comprises:

decompressing the compressed ACPI byte pattern; and loading a decompressed ACPI byte pattern into a random access memory.

46. The method as defined in claim 44 wherein the step of un-masking the ACPI signature byte further comprises writing said byte pattern to a location within a random access memory that is accessible to an operating system.

\* \* \* \* \*